US007576502B2

(12) United States Patent
Pedemas et al.

(10) Patent No.: US 7,576,502 B2
(45) Date of Patent: Aug. 18, 2009

(54) METHOD AND APPARATUS FOR CLOSING A POWERED CLOSURE OF A VEHICLE

(75) Inventors: Didier Pedemas, Aillant sur Milleron (FR); Nicolas Guillaume, Bray en Val (FR); Paul Bizard, Sully sur Loire (FR)

(73) Assignee: ArvinMeritor Light Vehicle Systems - France (FR)

( * ) Notice: Subject to any disclaimer, the term of this patent is extended or adjusted under 35 U.S.C. 154(b) by 342 days.

(21) Appl. No.: 11/192,454

(22) Filed: Jul. 28, 2005

(65) Prior Publication Data

US 2007/0027587 A1 Feb. 1, 2007

(51) Int. Cl.
*H02P 7/00* (2006.01)

(52) U.S. Cl. ........................ 318/286; 318/266; 318/268; 318/466; 318/467; 318/468

(58) Field of Classification Search ................ 318/286, 318/280, 283, 55, 59, 66, 68, 146, 268, 265, 318/626, 466, 467, 468, 282; 296/155
See application file for complete search history.

(56) References Cited

U.S. PATENT DOCUMENTS

| | | | | |
|---|---|---|---|---|
| 5,610,484 | A * | 3/1997 | Georgin | 318/286 |
| 5,801,501 | A * | 9/1998 | Redelberger | 318/283 |
| 5,872,436 | A * | 2/1999 | Bergmann et al. | 318/286 |
| 5,913,563 | A * | 6/1999 | Watanabe et al. | 296/155 |
| 5,950,365 | A | 9/1999 | Lieb et al. | |
| 5,994,858 | A * | 11/1999 | Miura | 318/283 |
| 6,051,945 | A * | 4/2000 | Furukawa | 318/280 |
| 6,172,475 | B1 * | 1/2001 | Fitzgibbon et al. | 318/266 |
| 6,194,855 | B1 * | 2/2001 | Lochmahr et al. | 318/283 |
| 6,435,600 | B1 * | 8/2002 | Long et al. | 296/155 |
| 6,456,022 | B1 * | 9/2002 | Fitzgibbon et al. | 318/162 |
| 6,678,601 | B2 * | 1/2004 | Whinnery | 701/49 |
| 6,710,560 | B2 * | 3/2004 | Fitzgibbon et al. | 318/264 |
| 6,814,394 | B2 * | 11/2004 | Yogo et al. | 296/155 |
| 6,943,515 | B2 * | 9/2005 | Kidokoro | 318/466 |
| 7,015,669 | B2 * | 3/2006 | Nagashima et al. | 318/443 |
| 7,067,996 | B2 * | 6/2006 | Yamamoto | 318/55 |
| 7,073,291 | B2 * | 7/2006 | Kawanobe et al. | 49/26 |
| 7,075,256 | B2 * | 7/2006 | Murray | 318/286 |
| 7,132,929 | B2 * | 11/2006 | Matsubara et al. | 340/426.1 |
| 7,170,244 | B2 * | 1/2007 | Choby | 318/280 |
| 7,224,136 | B2 * | 5/2007 | Saitou et al. | 318/286 |
| 2005/0012482 | A1 * | 1/2005 | Kidokoro | 318/280 |
| 2005/0275363 | A1 * | 12/2005 | Honma et al. | 318/280 |
| 2006/0038519 | A1 * | 2/2006 | Nakagawa et al. | 318/280 |
| 2006/0048451 | A1 * | 3/2006 | Fukumura et al. | 49/360 |

* cited by examiner

*Primary Examiner*—Bentsu Ro
*Assistant Examiner*—Antony M Paul
(74) *Attorney, Agent, or Firm*—Barnes & Thornburg LLP

(57) ABSTRACT

The apparatus for closing a closure of a vehicle comprises a closure driver for moving the closure and an electronic control unit electrically coupled to the closure driver. The electronic control unit is configured to determine if predetermined speed criteria is satisfied and to operate the closure driver so as to close the closure at a first closing speed if the predetermined speed criteria is satisfied or at a second closing speed if the predetermined speed criteria is not satisfied. The second closing speed is less than the first closing speed regardless of the position of the closure so that a squeezing force applied by the closure to an obstruction remains less than a predetermined squeezing force. An associated method is disclosed.

20 Claims, 2 Drawing Sheets

METHOD AND APPARATUS FOR CLOSING A POWERED CLOSURE OF A VEHICLE

FIELD OF THE DISCLOSURE

The present disclosure relates to methods and apparatus for closing a powered closure of a vehicle.

BACKGROUND OF THE DISCLOSURE

Vehicles may have any one or more of a power-operated window, partition, or roof panel system. Closing of such devices is regulated by the Federal Motor Vehicle Safety Standard (FMVSS 118) set forth at 49 C.F.R. § 571.

SUMMARY OF THE DISCLOSURE

According to an aspect of the present disclosure, there is provided an apparatus for closing a closure of a vehicle. The apparatus comprises a closure driver for moving the closure and an electronic control unit electrically coupled to the closure driver. The electronic control unit comprises a processor and a memory device that is electrically coupled to the processor and has stored therein a plurality of instructions which, when executed by the processor, cause the processor to determine if predetermined speed criteria is satisfied and to operate the closure driver so as to close the closure at a first closing speed if the predetermined speed criteria is satisfied or at a second closing speed if the predetermined speed criteria is not satisfied. The second closing speed is less than the first closing speed regardless of the position of the closure so that a squeezing force applied by the closure to an obstruction remains less than a predetermined squeezing force. An associated method is disclosed.

The above and other features of the present disclosure will become apparent from the following description and the attached drawings.

DETAILED DESCRIPTION OF THE DRAWINGS

Figure 1:
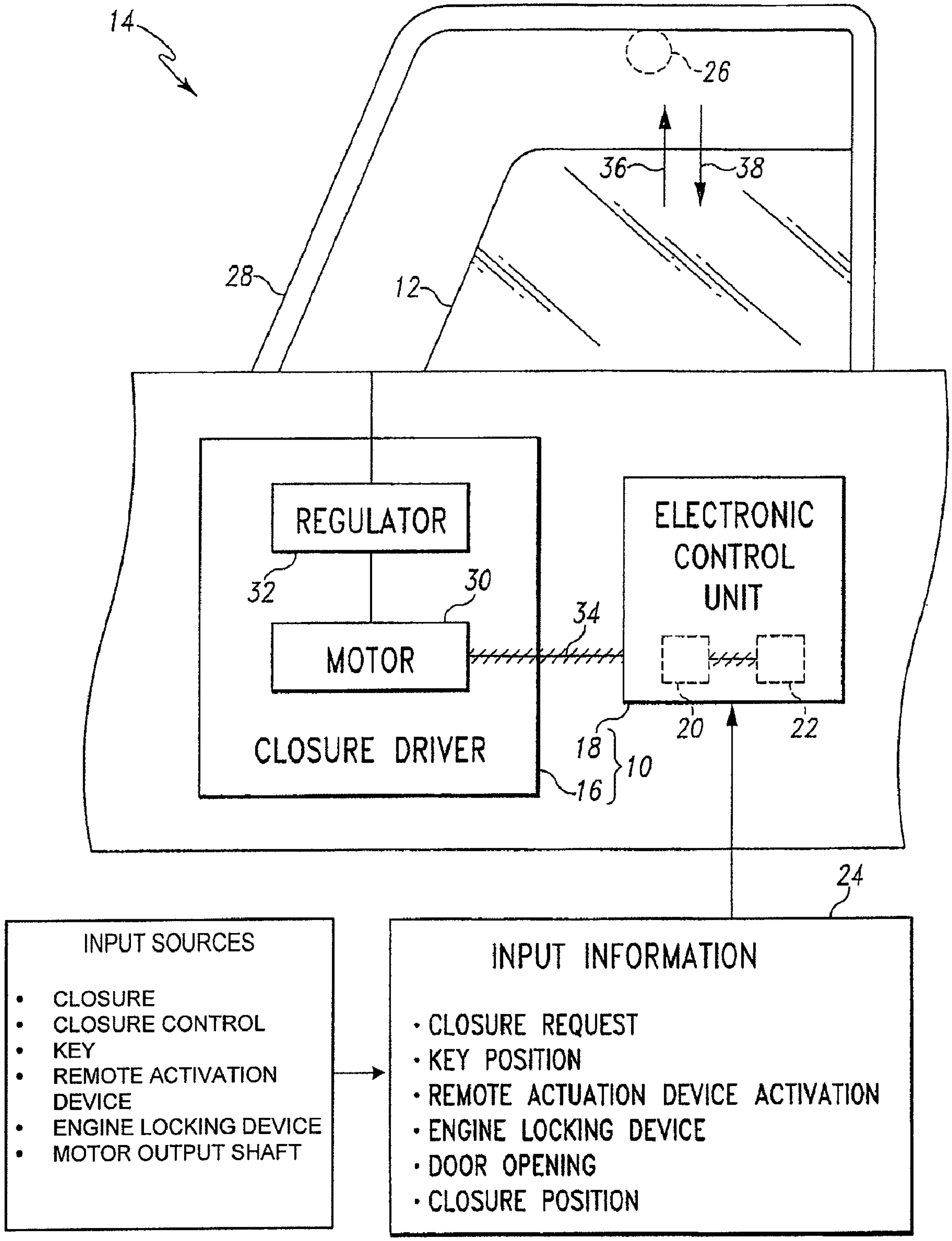
FIG. 1 is a simplified block diagram showing an apparatus for closing a powered closure of a vehicle.
Figure 2:
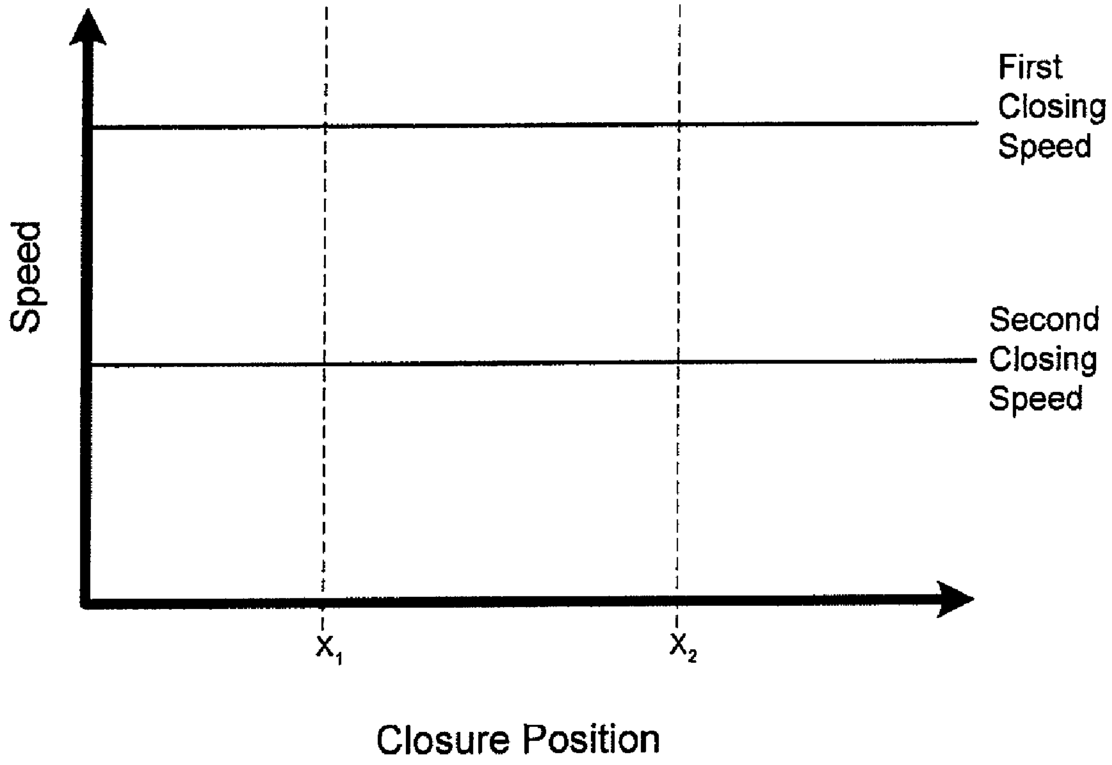
FIG. 2 is a simplified graph showing a second closing speed that is less than a first closing speed regardless of the position of a closure.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Referring to the FIGURE, there is shown an apparatus 10 for closing a powered closure 12 of a vehicle 14. The apparatus 10 comprises a closure driver 16 for moving the closure 12 and an electronic control unit 18 electrically coupled to the closure driver 16. The electronic control unit (ECU) 18 comprises a processor 20 and a memory device 22 that is electrically coupled to the processor 20 and has stored therein a plurality of instructions which, when executed by the processor 20, cause the processor 20 to determine if predetermined speed criteria is satisfied based on one or more inputs 24 to the ECU 18 and to operate the closure driver 16 so as to close the closure 12 at a first closing speed if the predetermined speed criteria is satisfied or at a second closing speed if the predetermined speed criteria is not satisfied. The second closing speed is less than the first closing speed regardless of the position of the closure 12 so that a squeezing force applied by the closure 12 to an obstruction 26 remains less than a predetermined squeezing force.

Exemplarily, the closure 12 is illustrated as a window of a door 28 of the vehicle 14 and the apparatus 10 is mounted to the door 28. In other examples, the closure 12 may be a partition or roof panel system of the vehicle 14.

The closure driver 16 has an electric motor 30 operated by electrical signals sent from the ECU 18 over an electrical line 34. In turn, the motor 30 operates a regulator 32 (known as a window regulator in the case where the closure 12 is a window). The regulator 32 converts rotation of the shaft of the motor 30 into movement of the closure 12. The closure driver 16 is thus able to move the closure 12 in a closing direction 36 and in an opening direction 38 in response to signals from the ECU 18.

The ECU 18 determines if predetermined speed criteria is satisfied and then determines the closing speed at which the closure 12 is to be closed depending on whether the predetermined speed criteria is satisfied or not. In particular, the ECU 18 determines if any of the following predetermined speed criteria exists upon receipt of a request to close the closure 12:

(a) a key that controls activation of an engine of the vehicle 14 is in an on position, a start position, or an accessory position, (b) there is continuous activation of a remote actuation device, provided that the remote actuation device is incapable of closing the closure 12 from a distance of more than six meters from the vehicle 14, (c) the closure request is received during the interval between the time a locking device which controls activation of the engine of the vehicle 14 is turned off and, in the case where the vehicle is a two-door vehicle, opening either door thereof or, in the case where the vehicle has more than two doors, opening a front door thereof, (d) the closure 12 is in a static position before commencement of closing of the closure 12 and in that static position creates an opening so small that a four millimeter diameter semi-rigid cylindrical rod cannot be placed through the opening from the inside of the vehicle 14 at any location around the edge of the opening in a manner such that the cylindrical surface of the rod contacts any part of a structure with which the closure 12 mates, or (e) there is continuous activation of a remote actuation device, provided that the remote actuation device is incapable of closing the closure 12 if the remote actuation device and the vehicle 14 are separated by an opaque surface and provided that the remote actuation device is incapable of closing the closure 12 from a distance of more than 11 meters from the vehicle 14.

(Such criteria is based on FMVSS 118, 49 C.F.R. § 571.118 (S4).)

To determine whether any of the predetermined speed criteria exists, the ECU 18 receives a number of inputs 24. For example, the ECU 18 receives inputs about any closure request (e.g., activation of a closure control by a person), the position of the key, activation of the remote actuation device, the position of an engine locking device, opening of the door 28, and the position of the closure 12 (e.g., determined by the position of the output shaft of the motor 30).

If any one of the predetermined speed criteria does exist, the predetermined speed criteria is considered to be satisfied and S4 of FMVSS 118, 49 C.F.R. § 571.118 is deemed to apply. In such a case, the ECU 18 operates the motor 30 at a first motor speed to cause the regulator 32 to close the closure 12 at the first closing speed.

On the other hand, if none of the predetermined speed criteria exists, the predetermined speed criteria is considered not to be satisfied and S5 of FMVSS 118, 49 C.F.R. § 571.118 is deemed to apply. In such a case, the ECU 18 operates the motor 30 at a second motor speed to cause the regulator 32 to close the closure 12 at the second closing speed. The second motor speed is less than the first motor speed so that the second closing speed is less than the first closing speed.

The slower second closing speed enables the apparatus 10 to avoid application of a predetermined squeezing force on the obstruction 26 having a predetermined force-deflection ratio. More specifically, in compliance with FMVSS 118, 49 C.F.R. § 571.118(S5), the slower second closing speed accounts for the overall time that it takes for the apparatus 10 to reverse the direction of movement of the closure 12 from the closing direction 36 to the opening direction 38 upon contact with the obstruction 26 due at least in part, for example, to inertia of the closure driver 16 so that the squeezing force applied by the closure 12 to the obstruction 26 having a predetermined force-deflection ratio of at least, for example, 65 Newtons/millimeter remains less than a predetermined squeezing force of, for example, 100 Newtons.

The second closing speed is less than the first closing speed regardless of the position of the closure 12 within its range of motion. In other words, regardless whether the closure 12 happens to be at its fully open position, near its fully closed position (closing speed at fully closed position inapplicable because it goes to zero at fully closed position), or somewhere in between, the second closing speed is less than the first closing speed. The apparatus 10 is thus able to limit application of the squeezing force to less than the predetermined squeezing force of, for example, 100 Newtons on an obstruction 26 having a predetermined force-deflection ratio of at least, for example, 65 Newtons/millimeter.

Exemplarily, the second closing speed is a constant speed. The second closing speed may be, for example, half of the first closing speed, although it may be any other closing speed less than the first closing speed so long as the squeezing force remains below the predetermined squeezing force on an obstruction 26 having at least the predetermined force-deflection ratio.

While the concepts of the present disclosure have been illustrated and described in detail in the drawings and foregoing description, such illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A method of closing a closure of a vehicle, the method comprising the steps of:

determining if predetermined speed criteria is satisfied, closing the closure at a first closing speed from a first closure position toward a second closure position by use of vehicle power if the predetermined speed criteria is satisfied, and closing the closure at a second closing speed from the first closure position toward the second closure position by use of vehicle power if the predetermined speed criteria is not satisfied, the second closing speed being less than the first closing speed regardless of the position of the closure between the first closure position and the second closure position so that a squeezing force applied by the closure to an obstruction remains less than a predetermined squeezing force, wherein the predetermined speed criteria specify conditions that permit closing the closure without requiring the squeezing force applied by the closure to the obstruction being less than the predetermined squeezing force.

2. The method of claim 1, wherein:

the determining step comprises determining that the predetermined speed criteria is satisfied if at least one of the following predetermined speed criteria exists upon receipt of a request to close the closure:

a key that controls activation of an engine of the vehicle is in an on position, a staff position, or an accessory position, there is continuous activation of a remote actuation device incapable of closing the closure from a distance of more than six meters from the vehicle, the closure request is received during the interval between the time a locking device which controls activation of the engine of the vehicle is turned off and, in the case where the vehicle is a two-door vehicle, opening either door thereof or, in the case where the vehicle has more than two doors, opening a front door thereof the closure is in a static position before commencement of closing of the closure and in that static position creates an opening so small that a four millimeter diameter semi-rigid cylindrical rod cannot be placed through the opening from the inside of the vehicle at any location around the edge of the opening in a manner such that the cylindrical surface of the rod contacts any part of a structure with which the closure mates, and there is continuous activation of a remote actuation device incapable of closing the closure if the remote actuation device and the vehicle are separated by an opaque surface and incapable of closing the closure from a distance of more than 11 meters from the vehicle.

3. The method of claim 1, wherein the second closing speed is a constant speed such that the closing the closure at the second closing speed step comprises closing the closure at the constant second closing speed if the predetermined speed criteria is not satisfied.

4. The method of claim 1, wherein the closing the closure at the second closing speed step comprises closing the closure at the second closing speed which is about half of the first closing speed.

5. The method of claim 1, wherein the closing the closure at the second closing speed step comprises closing the closure at the second closing speed so that the squeezing force applied to an obstruction having a force-deflection ratio of at least 65 Newtons/millimeter remains less than 100 Newtons.

6. The method of claim 1, wherein the closing the closure at the first closing speed step comprises closing a window at the first closing speed if the predetermined speed criteria is satisfied, and the closing the closure at a second closing speed step comprises closing the window at the second closing speed if the predetermined speed criteria is not satisfied.

7. The method of claim 1, wherein the determining step comprises determining that the predetermined speed criteria is satisfied if, upon receipt of a request to close the closure, there is continuous activation of a remote actuation device incapable of closing the closure if the remote actuation device and the vehicle are separated by an opaque surface and incapable of closing the closure from a distance of more than 11 meters from the vehicle.

8. The method of claim 1, wherein the determining step comprises determining that the predetermined speed criteria is satisfied if, upon receipt of a request to close the closure, the closure request is received during the interval between the time a locking device which controls activation of the engine of the vehicle is turned off and, in the case where the vehicle is a two-door vehicle, opening either door thereof or, in the case where the vehicle has more than two doors, opening a front door thereof.

9. An apparatus for closing a closure of a vehicle, the apparatus comprising:

a closure driver for moving the closure, and an electronic control unit electrically coupled to the closure driver, the electronic control unit comprising (i) a processor, and (ii) a memory device electrically coupled to the processor, the memory device having stored therein a plurality of instructions which, when executed by the processor, cause the processor to:

determine that predetermined speed criteria are satisfied if there is continuous activation of a remote actuation device incapable of closing the closure from a distance of more than six meters from the vehicle, operate the closure driver so as to move the closure from a first closure position toward a second closure position at a first closing speed if the predetermined speed criteria is satisfied, and operate the closure driver so as to move the closure from the first closure position to the second closure position at a second closing speed if the predetermined speed criteria is not satisfied, the second closing speed being less than the first closing speed regardless of the position of the closure between the first closure position and the second closure position so that a squeezing force applied by the closure to an obstruction remains less than a predetermined squeezing force.

10. The apparatus of claim 9, wherein:

the memory device has stored therein a plurality of instructions which, when executed by the processor, cause the processor to:

determine that the predetermined speed criteria are satisfied if any of the following predetermined speed criteria exists upon receipt of a request to close the closure:

a key that controls activation of an engine of the vehicle is in an on position, a start position, or an accessory position, the closure request is received during the interval between the time a locking device which controls activation of the engine of the vehicle is turned off and, in the case where the vehicle is a two-door vehicle, opening either door thereof or, in the case where the vehicle has more than two doors, opening a front door thereof, the closure is in a static position before commencement of closing of the closure and in that static position creates an opening so small that a four millimeter diameter semi-rigid cylindrical rod cannot be placed through the opening from the inside of the vehicle at any location around the edge of the opening in a manner such that the cylindrical surface of the rod contacts any part of a structure with which the closure mates, or there is continuous activation of a remote actuation device incapable of closing the closure if the remote actuation device and the vehicle are separated by an opaque surface and incapable of closing the closure from a distance of more than 11 meters from the vehicle.

11. The apparatus of claim 9, wherein the second closing speed is a constant speed.

12. The vehicle apparatus of claim 9, wherein the second closing speed is about half of the first closing speed.

13. The apparatus of claim 9, wherein the second closing speed is such that the squeezing force applied to an obstruction having a force-deflection ratio of at least 65 Newtons/millimeter remains less than 100 Newtons.

14. The apparatus of claim 9, wherein the closure driver comprises an electric motor that operates at first motor speed to provide the first closing speed and at slower second motor speed to provide the second closing speed.

15. The apparatus of claim 9, wherein the electronic control unit receives at least one input to determine if the predetermined speed criteria is satisfied.

16. A vehicle door, comprising:

a window, an electric motor, a window regulator interconnecting the motor and the window, and an electronic control unit electrically coupled to the motor, the electronic control unit comprising (i) a processor, and (ii) a memory device electrically coupled to the processor, the memory device having stored therein a plurality of instructions which, when executed by the processor, cause the processor to:

determine that predetermined speed criteria are satisfied if a key that controls activation of an engine of the vehicle is in an on position, a start position, or an accessory position, and operate the motor so as to close the window at a first closing speed over a range of motion if the predetermined speed criteria is satisfied or at a second closing speed over the range of motion if the predetermined speed criteria is not satisfied, the second closing speed being less than the first closing speed regardless of the position of the window over the range of motion so that a squeezing force applied by the window to an obstruction remains less than a predetermined squeezing force.

17. The vehicle door of claim 16, wherein:

the memory device has stored therein a plurality of instructions which, when executed by the processor, cause the processor to:

determine that the predetermined speed criteria are satisfied if any of the following predetermined speed criteria exists upon receipt of a request to close the window:

there is continuous activation of a remote actuation device incapable of closing the window from a distance of more than six meters from the vehicle, the closure request is received during the interval between the time a locking device which controls activation of the engine of the vehicle is turned off and, in the case where the vehicle is a two-door vehicle, opening either door thereof or, in the case where the vehicle has more than two doors, opening a front door thereof, the window is in a static position before commencement of closing of the window and in that static position creates an opening so small that a four millimeter diameter semi-rigid cylindrical rod cannot be placed through the opening from the inside of the vehicle at any location around the edge of the opening in a manner such that the cylindrical surface of the rod contacts any part of a structure with which the window mates, or there is continuous activation of a remote actuation device incapable of closing the window if the remote actuation device and the vehicle are separated by an opaque surface and incapable of closing the window from a distance of more than 11 meters from the vehicle.

18. The vehicle door of claim 16, wherein the second closing speed is a constant speed, and the second closing speed is about half of the first closing speed.

19. The vehicle door of claim 16, wherein the second closing speed is such that the squeezing force applied to an obstruction having a force-deflection ratio of at least 65 Newtons/millimeter remains less than 100 Newtons.

20. The vehicle door of claim 16, wherein the electronic control unit receives at least one input to determine if the predetermined speed criteria is satisfied.

* * * * *